United States Patent [19]

Kanda

[11] Patent Number: 4,690,105
[45] Date of Patent: Sep. 1, 1987

[54] CYLINDER HEAD WITH COOLANT PASSAGE FOLLOWING SQUISH AREA AND OF GENERALLY UNIFORM CROSS SECTIONAL AREA

[75] Inventor: Mutsumi Kanda, Toyota, Japan

[73] Assignee: Toyota Jidosha Kabushiki Kaisha, Aichi, Japan

[21] Appl. No.: 863,972

[22] Filed: May 16, 1986

[30] Foreign Application Priority Data

May 30, 1985 [JP] Japan .................. 60-117561

[51] Int. Cl.$^4$ .............................................. F01P 3/02
[52] U.S. Cl. ......................... 123/41.82 R; 123/193 H
[58] Field of Search .................... 123/41.74, 41.82 R, 123/493 H

[56] References Cited

U.S. PATENT DOCUMENTS

| | | | |
|---|---|---|---|
| 4,438,734 | 3/1984 | Hayashi | 123/193 H |
| 4,497,289 | 2/1985 | Bortolussi | 123/193 H |
| 4,567,859 | 2/1986 | Taguchi et al. | 123/41.82 R |

FOREIGN PATENT DOCUMENTS 142412  6/1979  Japan .................. 123/41.82 R

Primary Examiner—William A. Cuchlinski, Jr.
Attorney, Agent, or Firm—Kenyon & Kenyon

[57] ABSTRACT

An internal combustion engine of an automotive vehicle has a cylinder block formed with a cylinder bore, and a piston is fitted in the bore and reciprocates in it. A cylinder head is affixed to the cylinder block and defines a combustion chamber in cooperation with the piston and the cylinder bore. This cylinder head is formed with a portion which in cooperation with a portion of the piston defines a squish area of the combustion chamber, and with a coolant passage which substantially follows through the cylinder head adjacent to the squish area so as directly to cool the squish area. The coolant passage is of substantially the same cross sectional area along its extent. Thereby, the flow of coolant through the coolant passage is kept substantially uniform and at uniform speed throughout its extent, and cooling of the squish area is enhanced. If the squish area bulges inwards towards the central axis of the cylinder bore, then the inner wall of the coolant passage may bulge inwards so as to follow the inward bulging of the squish area; and in this case the outer wall of the coolant passage may likewise bulge inwards so as to follow this inward bulging of the inner wall of the coolant passage. The inlet or the outlet of the coolant passage may be restricted by a bulge defined by a portion of the cylinder head which surrounds a cylinder head bolt receiving hole formed in the cylinder head.

6 Claims, 2 Drawing Figures

CYLINDER HEAD WITH COOLANT PASSAGE FOLLOWING SQUISH AREA AND OF GENERALLY UNIFORM CROSS SECTIONAL AREA

BACKGROUND OF THE INVENTION

The present invention relates to a cylinder head for an internal combustion engine for a vehicle such as an automobile, and more particularly relates to such a cylinder head, the construction of which incorporates a coolant passage for cooling a squish area defined between the cylinder head and a cylinder piston, in which the configuration of said coolant passage is improved for improving the cooling effect provided for said squish area.

An internal combustion engine for a vehicle such as an automobile is often liquid cooled, and in such a case the cylinder head thereof is typically formed with various passages for coolant flow, circulation of liquid coolant such as water through which is effective for cooling said cylinder head and also a cylinder block of the engine. Such a coolant passage is typically formed to run around a part of the periphery of the portion of the cylinder head which defines the roof of a combustion chamber thereof. And, in general, it is known that the configuration of such coolant passages in the cylinder head has a great effect upon the mechanical octane value of the internal combustion engine as a whole.

In order to maintain this mechanical octane value of the internal combustion engine at a desirably high level, it is required to construct the coolant passage so that flow of coolant through it effectively cools the portion of the cylinder head which defines the roof of the combustion chamber, and in particular good cooling should be provided to those portions of the combustion chamber roof which define knocking points, such as the end gas area and any squish areas which are defined in the combustion chamber in cooperation with the piston for said combustion chamber, because such an end gas area and such a squish area are particularly likely to become knocking points. Therefore, it is desirable to so arrange the coolant passage as to well cool such a squish area, and in Japanese Patent Application Ser. No. Sho. 58-35221 (1983), which it is not intended hereby to admit as prior art to the present patent application except to the extent otherwise required by applicable law, there is disclosed a cylinder head construction which gives particularly powerful cooling to such a squish area, in order to maintain the mechanical octane value of the internal combustion engine at a desirably high level.

Now, such a coolant passage which cools the squish area is typically a so-called port lower coolant passage which extends between an intake port or an exhaust port formed in the cylinder head and said combustion chamber roof defining portion of said cylinder head. Nowadays, there is a continuing drive for making internal combustion engines as compact as possible, and particularly the space available in the cylinder head is becoming more and more crowded. This is particularly the case for internal combustion engines which are provided with more than two valves for each of their combustion chambers, such as so-called four-valve engines. In the construction of such a cylinder head, the space available for forming bosses for defining cylinder bolt holes, through which are passed the cylinder head bolts which secure the cylinder head to the cylinder block of the internal combustion engine, becomes rather restricted, and a convenient point to locate said cylinder head bolt bosses is at positions along the cylinder head, in the longitudinal direction of the cylinders, between each cylinder and its neighbor. In such a configuration, it becomes difficult to prevent these cylinder head bolt bosses from obstructing either the inlet of such a squish area cooling port lower coolant passage or the outlet thereof, and quite often in fact both said inlet and said outlet of said coolant passage are obstructed. In such a case, the middle portion of said squish area cooling port lower coolant passage, which is the portion actually adjacent to said squish area which cools said squish area, has a substantially larger cross sectional area than do the inlet and outlet of said passage, and this means that a sufficient flow speed for coolant through this middle passage portion is not attained. Further eddies are produced at said middle passage portion, and as a result, the effectiveness of the cooling provided for the squish area tends not to be sufficient. Furthermore, if there is a connecting aperture in this squish area cooling port lower coolant passage which opens to a coolant passage in the cylinder block of the engine, then coolant will flow in through this connecting aperture from said cylinder block into said port lower coolant passage, but the coolant within the cylinder head coolant passage has a strong tendency to flow across in the direction of the alignment of the engine cylinders, and therefore the coolant which has flowed into the cylinder head coolant passage from the connecting aperture also, after impinging upon the lower wall of the cylinder head coolant passage, has a strong tendency to flow laterally and to flow out without the squish area being sufficiently cooled.

SUMMARY OF THE INVENTION

Accordingly, it is the primary object of the present invention to provide an internal combustion engine cylinder head for an internal combustion engine which avoids the above described problems.

It is a further object of the present invention to provide an internal combustion engine cylinder head which provides good cooling for a squish area defined in a combustion chamber of the engine.

It is a further object of the present invention to provide such a cylinder head which maintains the mechanical octane value of the engine high.

It is a yet further object of the present invention to provide such a cylinder head which particularly provides good cooling for a portion or portions of the cylinder head that are prone to be knocking spots thereof.

It is a yet further object of the present invention to provide such a cylinder head which militates to prevent knocking of the engine.

It is a yet further object of the present invention to provide such a cylinder head, formed with such a coolant passage, which maintains good coolant flow in said coolant passage.

It is a yet further object of the present invention to provide such a cylinder head, formed with such a coolant passage, which helps to prevent the generation of eddies in said coolant passage.

It is a yet further object of the present invention to provide such a cylinder head, formed with such a coolant passage, which helps to prevent the generation of stagnant spots at portions of said coolant passage where the flow speed therein is relatively low.

According to the most general aspect of the present invention, these and other objects are accomplished by, for an internal combustion engine of an automotive vehicle, comprising a cylinder block formed with a cylinder bore and a piston fitted in said bore and reciprocating therein: a cylinder head for affixment to said cylinder block and for defining a combustion chamber in cooperation with said piston and said cylinder bore, formed with: (a) a portion which in cooperation with a portion of said piston defines a squish area of said combustin chamber; and: (b) a coolant passage which substantially follows through said cylinder head adjacent to said squish area so as directly to cool said squish area; (c) said coolant passage being of substantially the same cross sectional area along its extent.

According to the present invention as described above, the coolant flows well through the portion of this coolant passage which thus directly cools the squish area, which is typically the intermediate portion thereof, because the coolant passage is of substantially the same cross sectional area along its extent; and the coolant flow speed does not decrease at said squish area cooling portion, and the coolant flow does not develop eddies or stagnate at this point. Accordingly, the squish area is well and effectively cooled by this portion of the coolant passage, and thus the prevention of knocking at the squish area of the combustion chamber is effectively assured, and the mechanical octane value of the engine is maintained as high.

Further, according to certain particular specializations of the principle of the present invention, the above objects may be more particularly accomplished by a cylinder head as defined above, wherein the inner wall of said coolant passage bulges inwards towards the central axis of said cylinder bore to follow an inward bulging of said squish area; and in such a case it will be typical that the outer wall of said coolant passage should likewise bulge inwards towards the central axis of said cylinder bore to follow said inward bulging of said inner wall of said coolant passage. Such constructions serve well for maintaining good uniformity of the cross sectional area of the coolant passage.

BRIEF DESCRIPTION OF THE DRAWINGS

The present invention will now be shown and described with regard to the preferred embodiment thereof, and with reference to the illustrative drawings, which however should not be considered as limitative of the present invention in any way, since the scope of the present invention is to be considered as being delimited solely by the accompanying claims, rather than by any particular features of the disclosed embodiment or of the drawings. In these drawings:

DESCRIPTION OF THE PREFERRED EMBODIMENT

Figure 1:
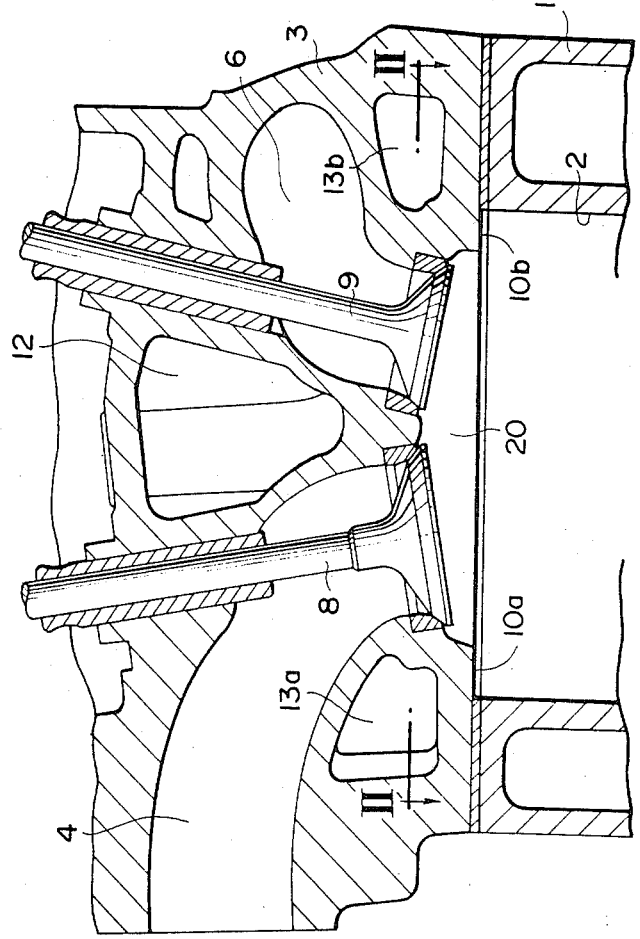
FIG. 1 is a partial setnical view of a cylinder block and a cylinder head of an internal combustion engine, taken in a plane shown by the arrows I—I in FIG. 2, and of a combustion chamber defined therebetween, taken in a plane including the central longitudinal axis of one of several cylinder bores of said cylinder block and perpendicular to the longitudinal direction of said cylinder block along the line of said several cylinders thereof, said cylinder head being the preferred embodiment of the present invention.

The present invention will now be described with reference to the preferred embodiment thereof. FIG. 1 is a partial sectional view of an internal combustion engine which comprises a cylinder block denoted by the reference numeral 1 and a cylinder head, which is the preferred embodiment of the cylinder head of the present invention, denoted by the reference numeral 3. The cylinder block 1 is formed with a cylinder bore 2, and FIG. 1 is taken in a plane including the central longitudinal axis of said cylinder bore 2. In this cylinder bore 2 there reciprocates a piston, not particularly shown in the drawings, and between said piston, said cylinder head 3, and the upper portion of said cylinder bore 2, there is defined a combustion chamber 20 for this piston and cylinder. And the fitting of the cylinder head 3 to the cylinder block 1 is done by the use of cylinder head bolts, not particularly shown, fitted through cylinder head bolt holes 16 formed in bosses 17 formed in the cylinder head 3 between each pair of adjacent cylinders, as particularly shown in the FIG. 2 view.

Figure 2:
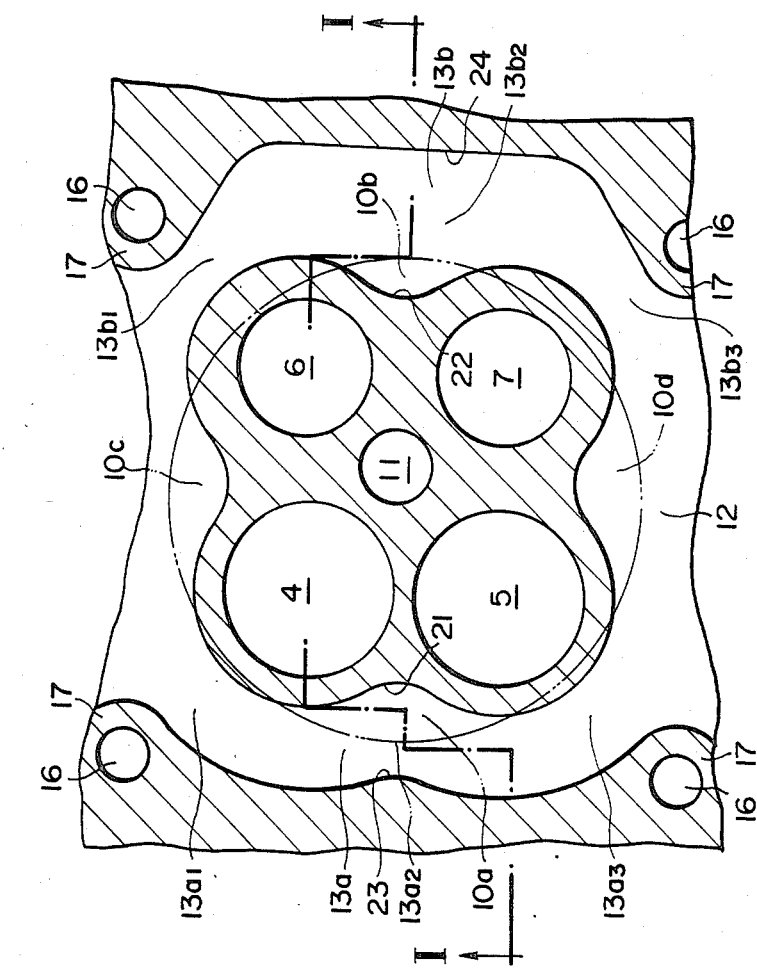
FIG. 2 is a partial transverse sectional view of a portion of said cylinder head taken in a plane shown by the arrows II—II in FIG. 1.

The cylinder head 3 is formed with two intake ports 4 and 5 and two exhaust ports 6 and 7, which open via respective valve seats to said cylinder chamber 20, with the centers of said valve seats approximately at the corners of a square, as generally shown in FIG. 2. Thus, this internal combustion engine is of the four-valve type. And the intake ports 4 and 5 for the various cylinders of this engine are all arranged on the one side of the cylinder block 1 and the cylinder head 3, in the longitudinal direction of said cylinder head 3 along the row of cylinders thereof, which corresponds to the direction perpendicular to the drawing paper in FIG. 1 and to the vertical direction in FIG. 2; and, similarly, the exhaust ports 6 and 7 for the various cylinders are all arranged on the other side to said one side of the cylinder block 1 and the cylinder head 3, again in the vertical direction of said cylinder head 3 as seen in FIG. 2 along the row of cylinders thereof. Poppet valves 8 (of which only one can be seen in the sectional view of FIG. 1) of a per se known type, mounted in per se known valve guides fitted in the cylinder head 3, are provided for cooperating with intake valve seats inset around the edges of each of the intake ports 4 and 5, so as to open/close control communication between said intake ports 4 and 5 and the combustion chamber 20; and two other poppet valves 9, also per se known and mounted in per se known valve guides fitted in the cylinder head 3, and again only one of which can be seen in FIG. 1, are provided for similarly cooperating with exhaust valve seats inset around the edges of the exhaust ports 6 and 7, so as similarly to open/close control the communication between said exhaust ports 6 and 7 and said combustion chamber 20. And by actuation of these intake poppet valves 8 and exhaust poppet valves 9 by per se known valve gear not particularly shown, the internal combustion engine is caused to operate according to an Otto cycle so as to generate rotational power.

As best seen in FIG. 2, substantially in the middle of the portion of the cylinder head 3 defining the roof of the combustion chamber 20, there is formed a screw hole 11 for fitting a spark plug (not particularly shown in the drawings) thereinto. And said portion of the cylinder head 3 defining said roof of said combustion chamber 20 and the engine piston (not particularly shown) are so formed as to define between them squish areas as follows: between the two intake ports 4 and 5 there is defined, as relatively smoothly bulging inward from the circular periphery of the combustion chamber 20 defined by the cylinder bore 2, an intake port side squish area 10a; between the two exhaust ports 6 and 7 there is defined, also as relatively smoothly bulging inward from said circular periphery of the combustion chamber 20, an exhaust port side squish area 10b; between the intake port 4 and the exhaust port 6 there is defined as bulging inward from said circular periphery of the combustion chamber 20 a first intake - exhaust side squish area 10c; and between the other intake port 5 and the other exhaust port 7 there is defined as bulging inward from said circular periphery of the combustion chamber 20 a second intake - exhaust side squish area 10d. Thus, as will be appreciated from consideration of FIG. 2, the non-squish area defining portion of the combustion chamber 20 extends generally in four rings each of substantially uniform width around the peripheries of each of the valve seats of the intake and exhaust valves 4 through 7, said four rings being connected by a central portion.

Through the cylinder head 3 there is formed a system of coolant passages for admitting flow of a coolant such as water for cooling said cylinder head 3 and the cylinder block 1, said coolant passages extending generally in the direction perpendicular to the drawing paper in FIG. 1 and in the vertical direction as seen in FIG. 2, generally along the line of the cylinders of the internal combustion engine. This system of coolant passages includes a main coolant passage 12 which passes between the intake port 4 and the exhaust port 6, around the defining wall portions of the screwed spark plug hole 11, and between the intake port 5 and the exhaust port 7, which is not particularly relevant to the present invention; an intake port side lower coolant passage 13a which passes between the intake ports 4 and 5 and the lower surface of the cylinder head 3 which defines the intake port side squish area 10a, which incorporates the particular distinguishing feature of this preferred embodiment of the cylinder head of the present invention; and an exhaust port side lower coolant passage 13b which passes between the exhaust ports 6 and 7 and the lower surface of the cylinder head 3 which defines the exhaust port side squish area 10b, which specifically does not incorporate said particular distinguishing feature of the present invention.

In detail, as shown in the sectional view of FIG. 2, the intake port side lower coolant passage 13a is formed of substantially uniform cross sectional area along its length as passing past the intake ports 4 and 5 and the lower surface of the cylinder head 3 which defines the intake port side squish area 10a, while the exhaust port side lower coolant passage 13b is formed of substantially varying cross sectional area along its length as passing past the exhaust ports 6 and 7 and the lower surface of the cylinder head 3 which defines the exhaust port side squish area 10b. That is, with regard to the intake port side lower coolant passage 13a, its side wall on the side towards the central axis of the cylinder bore 2 is bent inwards in a curved portion 21 generally corresponding to the inward side defining line of the intake port side squish area 10a, so that said intake port side squish area 10a is directly cooled by the coolant flowing through said intake port side lower coolant passage 13a; and, similarly, with regard to the exhaust port side lower coolant passage 13b, its side wall on the side towards the central axis of the cylinder bore 2 is bent inwards in a curved portion 22 generally corresponding to the inward side defining line of the exhaust port side squish area 10b, so that said exhaust port side squish area 10b is directly cooled by the coolant flowing through said exhaust port side lower coolant passage 13b. Further, in addition to this construction, with regard to said intake port side lower coolant passage 13a, its side wall on the side outwards from said central axis of the cylinder bore 2 is also bent inwards in a curved wall portion 23 generally corresponding to the inward side defining line of the intake port side squish area 10a, by just about the correct amount to restrict the middle part of said intake port side lower coolant passage 13a as much as its inlet and outlet portions are restricted by the bosses 17 for the cylinder head bolts 16 which define their one sides, but not so much, however, as to stop the coolant flowing through said intake port side lower coolant passage 13a from directly cooling said intake port side squish area 10a, and by this the cross sectional area of said intake port side lower coolant passage 13a is brought to be approximately constant all along its length, and in particular is substantially the same at the central portion 13a2 of said passage 13a which is restricted by said curved wall portion 23, as at its inlet portion 13a1 or its outlet portion 13a3 which are restricted by said cylinder head bolt bosses 17. However, this constructional concept is not practiced with regard to the exhaust port side lower coolant passage 13b, althouth in another possible embodiment of the cylinder head according to the present invention it well could be; but on the contrary the side wall on the side outwards from said central axis of the cylinder bore 2 of said exhaust port side lower coolant passage 13b is not substantially bent inwards, but instead is formed as a generally straight portion 24. Thus, the cross sectional area of said exhaust port side lower coolant passage 13b is not at all constant all along its length, but is very substantially greater in the vicinity of the exhaust port side squish area 10b, at the central portion 13b2 of said passage 13b, than at its inlet portion 13b1 or its outlet portion 13b3, both of which are relatively restricted by the respective cylinder head bolt bosses 17.

According to this construction, the following beneficial effects are obtained. Since the cross sectional area of the intake port side lower coolant passage 13a is arranged to be approximately constant all along its length, the flow of coolant through said intake port side lower coolant passage 13a, from its inlet portion 13a1 through its central portion 13a2 to its outlet portion 13a3, occurs at substantially a uniform speed which is relatively high. Further, since said coolant flow is very smooth, little loss of speed thereof occurs. And, in particular, the cooling of the intake port side squish area 10a located between the two intake ports 4 and 5 of the combustion chamber 20, which might tend to become a knocking area in said combustion chamber 20, by the central portion 13a2 of said intake port side coolant passage 13a is good, because the flow speed of coolant in said intake port side lower coolant passage 13a is relatively high at said central portion 13a2 thereof. Thereby, the likelihood of the occurrence of knocking of the engine is significantly reduced, and accordingly the mechanical octane value of the engine is increased.

On the other hand, considering the case of the exhaust port side lower coolant passage 13b to illustrate the disadvantages entailed when the inventive concept of the present invention is not practiced, since the cross sectional area of the exhaust port side lower coolant passage 13*b* is not at all constant all along its length, the flow of coolant through said exhaust port side lower coolant passage 13*b*, from its inlet portion 13*b*1 through its central portion 13*b*2 to its outlet portion 13*b*3, occurs by no means at a uniform speed, and, since said coolant flow is not smooth, serious loss of speed thereof occurs. And, in particular, the cooling of the exhaust port side squish area 10*b* located between the two exhaust ports 6 and 7 of the combustion chamber 20 by the central portion 13*b*2 of said exhaust port side lower coolant passage 13*b* is relatively poor, because the flow speed of coolant in said exhaust port side lower coolant passage 13*b* is relatively low at said central portion 13*b*2 thereof. Thereby, the likelihood of the occurrence of knocking of the engine, as far as this point therein is concerned, is not reduced. Accordingly, although it is not so performed in this preferred embodiment, it is considered that it might be desirable in some circumstances to practice the construction of the present invention with regard to this exhaust port side lower coolant passage 13*b* also, depending however upon circumstances.

Although the present invention has been shown and described in terms of the preferred embodiment thereof, and with reference to the appended drawings, it should not be considered as being particularly limited thereby. The details of any particular embodiment, or of the drawings, could be varied without, in many cases, departing from the ambit of the present invention. Accordingly, the scope of the present invention is to be considered as being delimited, not by any particular perhaps entirely fortuitous details of the disclosed preferred embodiment, or of the drawings, but solely by the legitimate and properly interpreted scope of the accompanying claims, which follow.

What is claimed is:

1. For an internal combustion engine of an automotive vehicle, comprising a cylinder block formed with a cylinder bore and a piston fitted in said bore and reciprocating therein:
    a cylinder head for affixment to said cylinder block and for defining a combustion chamber in cooperation with said piston and said cylinder bore, formed with:
    (a) a portion which extends from a portion lying over a peripheral portion of said cylinder bore toward a central portion of said combustion chamber and which in cooperation with a portion of said piston defines a squish area of said combustion chamber; and:
    (b) a coolant passage formed through said cylinder head as convexly curved at a portion thereof adjacent to said squish area toward a central portion of said combustion chamber so as more extensively to overlie and directly to cool said squish area;
    (c) said coolant passage being of substantially the same cross sectional area along its extent.
2. A cylinder head according to claim 1, wherein said squish area is defined between a pair of ports formed in said cylinder head.
3. A cylinder head according to claim 2, wherein said pair of ports formed in said cylinder head are intake ports.
4. A cylinder head according to claim 1 or 2 or 3, wherein an inlet of said coolant passage is restricted by a bulge defined by a boss portion of said cylinder head which surrounds a cylinder head bolt receiving hole formed in said cylinder head.
5. A cylinder head according to claim 3, wherein an outlet of said coolant passage is restricted by a bulge defined by a boss portion of said cylinder head which surrounds a cylinder head bolt receiving hole formed in said cylinder head.
6. A cylinder head according to claim 1, wherein said cylinder block is formed with an intake port and an exhaust port opening to said combustion chamber, and said squish area over which said coolant passage lies as convexly curved toward the central portion of said combustion chamber is on a side portion of said combustion chamber closer to said intake port than to said exhaust port.

* * * * *